(12) United States Patent
Oyama et al.

(10) Patent No.: US 9,569,814 B2
(45) Date of Patent: *Feb. 14, 2017

(54) DISPLAY CONTROL APPARATUS, IMAGE CAPTURE APPARATUS, DISPLAY CONTROL METHOD, AND IMAGE CAPTURE APPARATUS CONTROL METHOD

(71) Applicant: CANON KABUSHIKI KAISHA, Tokyo (JP)

(72) Inventors: Yasufumi Oyama, Kawasaki (JP); Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,785

(22) Filed: Oct. 28, 2014

(65) Prior Publication Data

US 2015/0042687 A1 Feb. 12, 2015

Related U.S. Application Data

(63) Continuation of application No. 13/719,790, filed on Dec. 19, 2012, now Pat. No. 8,902,344.

(30) Foreign Application Priority Data

Dec. 28, 2011 (JP) .................................. 2011-289892
Dec. 28, 2011 (JP) .................................. 2011-289893

(51) Int. Cl.
*H04N 5/232* (2006.01)
*H04N 5/225* (2006.01)
(Continued)

(52) U.S. Cl.
CPC . *G06T 3/20* (2013.01); *G06T 3/00* (2013.01); *G06T 11/60* (2013.01); *H04N 5/225* (2013.01);
(Continued)

(58) Field of Classification Search
CPC H04N 5/225; H04N 1/32101; H04N 5/23293; H04N 5/445; H04N 5/44504; G06T 11/60
(Continued)

(56) References Cited

U.S. PATENT DOCUMENTS 8,584,008 B1 * 11/2013 Dulaney ............... G06F 17/211
715/212
2002/0030686 A1 * 3/2002 Sakai ........................ G06F 3/14
345/531

(Continued)

FOREIGN PATENT DOCUMENTS

CN 101072316 A 11/2007
CN 102202177 A 9/2011
(Continued)

OTHER PUBLICATIONS

The above foreign patent documents were cited in a Oct. 19, 2015 Japanese Office Action, which is enclosed with an English Translation, that issued in Japanese Patent Application No. 2011289893.
(Continued)

*Primary Examiner* — Abdelaaziz Tissire
(74) *Attorney, Agent, or Firm* — Cowan, Liebowitz & Latman, P.C.

(57) ABSTRACT

A display control apparatus displays, together with an image on a display unit, items related to a plurality of objects in the image. At this time, for the plurality of objects in the image, the display control apparatus displays items related to the respective objects at display positions having a predetermined relative positional relationship with the objects. The display control apparatus decides the order of priority of the plurality of objects. In case that the area of a main object having a highest decided priority level and the display position having the predetermined relative positional relationship for an item related to another object overlap each other, the display control apparatus adjusts the display
(Continued)

position of the item related to the other object to eliminate the overlapping, and displays the item related to the other object.

12 Claims, 14 Drawing Sheets

(51) Int. Cl.
    *G06T 3/20*     (2006.01)
    *G06T 3/00*     (2006.01)
    *H04N 5/445*     (2011.01)
    *G06T 11/60*     (2006.01)

(52) U.S. Cl.
    CPC .......... *H04N 5/23293* (2013.01); *H04N 5/445* (2013.01); *H04N 5/44504* (2013.01)

(58) Field of Classification Search
    USPC ..................................... 348/333.02
    See application file for complete search history.

(56) References Cited

U.S. PATENT DOCUMENTS

| | | | |
|---|---|---|---|
| 2005/0060665 A1* | 3/2005 | Rekimoto | G06F 9/4443 715/810 |
| 2007/0101282 A1* | 5/2007 | Goossen | G09G 5/14 715/764 |
| 2007/0222797 A1* | 9/2007 | Misawa | G01C 21/20 345/629 |
| 2007/0252913 A1* | 11/2007 | Minobe | H04N 5/44513 348/465 |
| 2008/0199056 A1* | 8/2008 | Tokuse | G06K 9/00295 382/118 |
| 2011/0032378 A1* | 2/2011 | Kaneda | G06K 9/00288 348/222.1 |
| 2011/0199502 A1* | 8/2011 | Okamura | H04N 5/23212 348/222.1 |
| 2011/0267529 A1* | 11/2011 | Tabata | H04N 1/00336 348/333.02 |
| 2012/0092369 A1* | 4/2012 | Kim | G06T 19/006 345/633 |
| 2013/0169839 A1* | 7/2013 | Takahashi | H04N 5/76 348/231.99 |
| 2013/0169850 A1* | 7/2013 | Oyama | G06T 3/00 348/333.02 |
| 2014/0063044 A1* | 3/2014 | Kim | G01C 21/367 345/592 |

FOREIGN PATENT DOCUMENTS

| | | |
|---|---|---|
| EP | 1030515 A | 8/2000 |
| JP | 2000-089877 A | 3/2000 |
| JP | 2011-060130 A | 3/2011 |
| JP | 2011-077934 A | 4/2011 |
| JP | 2011-160413 A | 8/2011 |

OTHER PUBLICATIONS

The above foreign patent documents were cited in a Jul. 3, 2015 Chinese Office Action, which is enclosed with an English Translation, that issued in Chinese Patent Application No. 201210572567.7.

* cited by examiner

DISPLAY CONTROL APPARATUS, IMAGE CAPTURE APPARATUS, DISPLAY CONTROL METHOD, AND IMAGE CAPTURE APPARATUS CONTROL METHOD

CROSS-REFERENCE TO RELATED APPLICATION

This application is a continuation of application Ser. No. 13/719,790, filed Dec. 19, 2012, the entire disclosure of which is hereby incorporated by reference.

BACKGROUND OF THE INVENTION

Field of the Invention

The present invention relates to a display control apparatus, image capture apparatus, display control method, and image capture apparatus control method.

Description of the Related Art

Recently, there is known an image capture apparatus which recognizes that a captured object is a person, and provides various value-added functions to the person object. Japanese Patent Laid-Open No. 2009-110147 discloses an image capture apparatus which performs processing of associating attribute data of a registered person with face image data detected by a face detection means, and displays a mark image and name data corresponding to it near a face area corresponding to the registered face image data.

However, when many faces exist in one frame or objects exist densely, the ratio of the name display area to the image becomes high, the name display overlaps the important person face, making the display less visible. When pieces of information to be displayed are dense, a personal computer or the like gives priority to objects, and superposes and displays them, which is generally known as a multiwindow system. Japanese Patent Laid-Open No. 11-015626 discloses an arrangement in which display objects are automatically aligned and displayed, in addition to control of the multi-window system.

However, by simple alignment, the display positions of an object and information related to the object are spaced apart from each other, and their relation becomes unclear. To solve this, more complicated display control is required to arrange display information while maintaining the relation with an object.

For an image capture apparatus having restrictions on the manufacturing cost and battery capacity, it is also important to suppress the performance of a mounted arithmetic device and the operating load on the arithmetic device. Hence, in image capturing accompanied by live view display which particularly requires high processing ability in real time, it is necessary to allocate the ability of the arithmetic device to image capture processing as much as possible, and avoid execution of complicated display control as described above.

SUMMARY OF THE INVENTION

The embodiments have been made to solve the above problems, and one aspect of the embodiments provides a display control apparatus capable of displaying an item related to an object by simple display control while maintaining the visibility of the object.

According to one aspect of the present invention, there is provided a display control apparatus comprising: a display control unit configured to display, together with an image on a display unit, items related to a plurality of objects in the image, the display control unit displaying, for the plurality of objects in the image, items related to the respective objects at display positions having a predetermined relative positional relationship with the objects; and a decision unit configured to decide an order of priority of the plurality of objects, wherein in case that an area of a main object having a high priority decided by the decision unit and a display position having the predetermined relative positional relationship for an item related to another object overlap each other, the display control unit adjusts the display position of the item related to the other object to eliminate the overlapping, and displays the item related to the other object.

According to another aspect of the present invention there is provided an image capture apparatus including a shooting mode in which a display unit performs live view display, and a playback mode in which the display unit displays a shot image for browsing, comprising: a display control unit configured to display, for a plurality of objects in an image displayed on the display unit, items related to the objects at display positions in the image that have a predetermined relative positional relationship with the objects; and a decision unit configured to decide an order of priority of the plurality of objects whose items are displayed, wherein the display control unit includes an adjustment unit which adjusts display of the item to widen a visible range of the item, and in the shooting mode, the adjustment unit executes the adjustment for only an item related to a main object having a high priority among the plurality of objects, and in the playback mode, executes the adjustment for items related to the respective objects.

According to another aspect of the present invention there is provided a display control method comprising: a display control step of displaying, together with an image on a display unit, items related to a plurality of objects in the image, in the display control step, for the plurality of objects in the image, items related to the respective objects being displayed at display positions having a predetermined relative positional relationship with the objects; and a decision step of deciding an order of priority of the plurality of objects, wherein in the display control step, in case that an area of a main object having a high priority decided in the decision step and a display position having the predetermined relative positional relationship for an item related to another object overlap each other, the display position of the item related to the other object is adjusted to eliminate the overlapping, and the item related to the other object is displayed.

According to another aspect of the present invention there is provided a method of controlling an image capture apparatus including a shooting mode in which a display unit performs live view display, and a playback mode in which the display unit displays a shot image for browsing, comprising: a display control step of displaying, for a plurality of objects in an image displayed on the display unit, items related to the objects at display positions in the image that have a predetermined relative positional relationship with the objects; and a decision step of deciding an order of priority of the plurality of objects whose items are displayed, wherein the display control step includes an adjustment step of adjusting display of the item to widen a visible range of the item, and in the adjustment step, in the shooting mode, the adjustment is executed for only an item related to a main object having a high priority among the plurality of objects, and in the playback mode, the adjustment is executed for items related to the respective objects.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

A preferred embodiment of the present invention will now be described with reference to the accompanying drawings.

Figure 1:
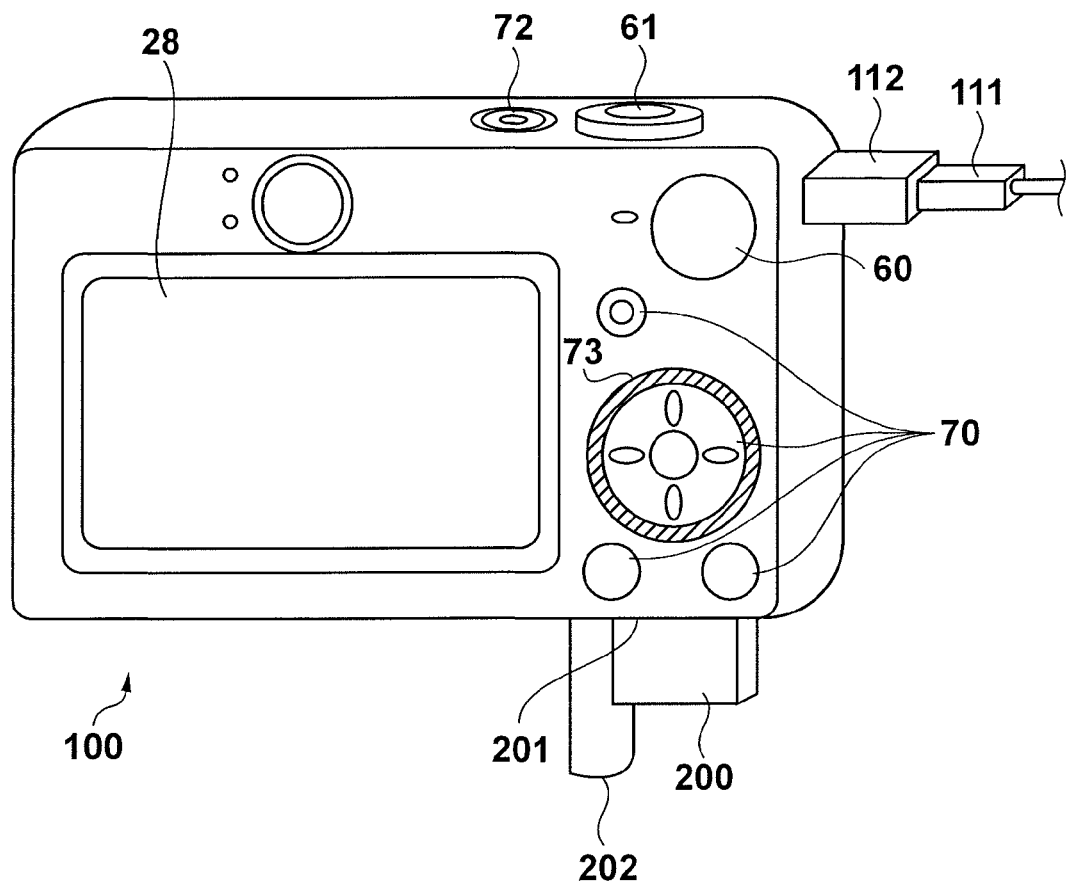
FIG. 1 is a view exemplifying the outer appearance of an image capture apparatus 100.

FIG. 1 is a view showing the outer appearance of an image capture apparatus 100 (digital camera) according to the embodiment. Referring to FIG. 1, a display unit 28 is formed from, for example, a liquid crystal display, and used to display images and various kinds of information. A shutter button 61 is an operation unit for issuing a shooting instruction. A mode switch 60 is an operation unit for switching between various modes. A connector 112 connects a connection cable 111 and the image capture apparatus 100. An operation unit 70 is formed from operation members such as various switches and buttons for accepting various operations from the user. A controller wheel 73 is an operation member which is included in the operation unit 70 and can be rotated. A power switch 72 switches between power ON and power OFF. A recording medium 200 is a recording medium such as a memory card or hard disk. A recording medium slot 201 is a slot for storing the recording medium 200. The recording medium 200 stored in the recording medium slot 201 can communicate with the image capture apparatus 100. A lid 202 is the lid of the recording medium slot 201.

Figure 2:
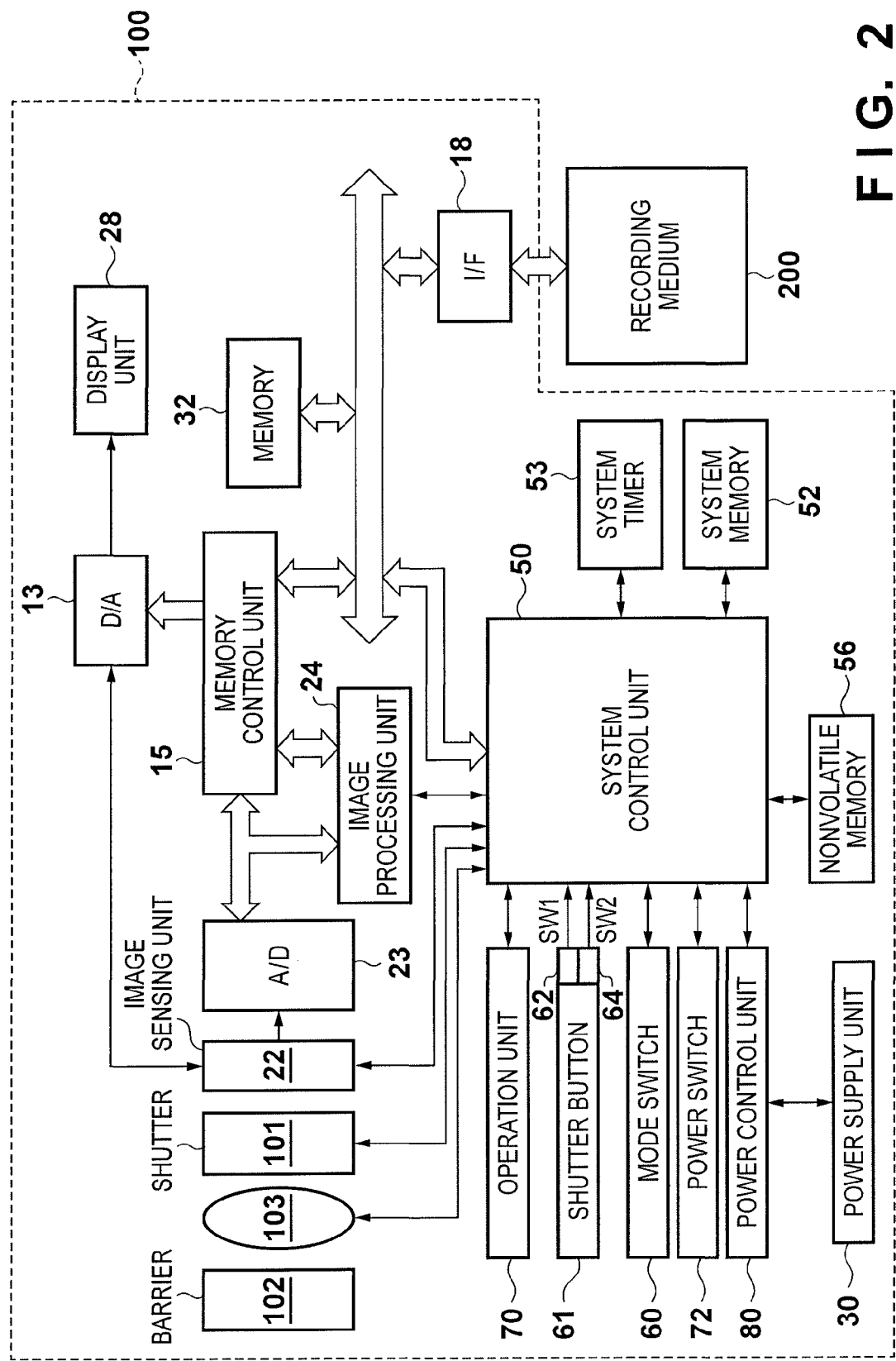
FIG. 2 is a block diagram exemplifying the hardware arrangement of the image capture apparatus 100.

FIG. 2 is a block diagram exemplifying the arrangement of the image capture apparatus 100 according to the embodiment. Referring to FIG. 2, a photographing lens 103 is a lens unit including a zoom lens and focus lens. A shutter 101 is a shutter having the stop function. An image sensing unit 22 includes an image sensor which converts an optical image into an electrical signal and is formed from a CCD element, CMOS element, or the like. An A/D converter 23 converts an analog signal into a digital signal. The A/D converter 23 is used to convert an analog signal output from the image sensing unit 22 into a digital signal. A barrier 102 protects the image sensing system of the image capture apparatus 100 from dirt and damage by covering the image sensing system including the photographing lens 103, shutter 101, and image sensing unit 22.

An image processing unit 24 performs predetermined pixel interpolation, resize processing such as reduction, and color conversion processing for data from the A/D converter 23 or data from a memory control unit 15. Also, the image processing unit 24 performs predetermined arithmetic processing using captured image data. Based on the obtained arithmetic result, a system control unit 50 performs exposure control and focus control. Accordingly, TTL (Through The Lens) AF (Auto Focus) processing, AE (Auto Exposure) processing, and EF (pre-Electronic Flash) processing are performed. The image processing unit 24 further performs predetermined arithmetic processing using captured image data. Based on the obtained arithmetic result, the image processing unit 24 also performs TTL AWB (Auto White Balance) processing.

Data output from the A/D converter 23 is directly written in a memory 32 via the image processing unit 24 and memory control unit 15 or via the memory control unit 15. The memory 32 stores image data which is obtained by the image sensing unit 22 and converted into digital data by the A/D converter 23, and image data to be displayed on the display unit 28. The memory 32 has a storage capacity enough to store a predetermined number of still images, a moving image of a predetermined time, and sound.

The memory 32 also functions as an image display memory (video memory). A D/A converter 13 converts image display data stored in the memory 32 into an analog signal, and supplies the analog signal to the display unit 28. In this manner, the display image data written in the memory 32 is displayed on the display unit 28 via the D/A converter 13. The display unit 28 presents a display corresponding to an analog signal from the D/A converter 13 on a display such as an LCD. The D/A converter 13 converts, into an analog signal, a digital signal which has been A/D-converted once by the A/D converter 23 and accumulated in the memory 32. Resultant analog signals are sequentially transferred to the display unit 28 and displayed, thereby implementing through image display (to be also referred to as live view display hereinafter). This provides an electronic viewfinder function in shooting.

A nonvolatile memory 56 is an electrically erasable/programmable memory. The nonvolatile memory 56 uses, for example, an EEPROM. The nonvolatile memory 56 stores constants, programs, and the like for the operation of the system control unit 50. The programs here include programs for executing various flowcharts to be described later in the embodiment.

The system control unit 50 controls the overall image capture apparatus 100. The system control unit 50 implements each processing of the embodiment to be described later by executing a program recorded in the nonvolatile memory 56. A system memory 52 is formed from a RAM. In the system memory 52, constants, variable, programs read out from the nonvolatile memory 56, and the like for the operation of the system control unit 50 are expanded. The system control unit 50 also performs display control by controlling the memory 32, D/A converter 13, display unit 28, and the like. A system timer 53 is a timepiece unit which measures the time taken for various control operations and the time of the built-in timer.

The mode switch 60, shutter button 61, and operation unit 70 are operation members for inputting various operation instructions to the system control unit 50.

The mode switch 60 switches the operation mode of the system control unit 50 to the shooting mode (including the still image shooting mode and moving image shooting mode) accompanied by live view display by the display unit 28, the playback mode for browsing captured images, and the like. Modes included in the still image shooting mode are the auto shooting mode, auto scene determination mode, manual mode, various scene modes having shooting mode-specific shooting settings, program AE mode, and custom mode. Switching to one of these modes included in the still image shooting mode may be performed using the mode switch 60. Alternatively, after temporarily switching to the still image shooting mode using the mode switch 60, the still image shooting mode may be switched to one of these modes included in the still image shooting mode using another operation member. Similarly, the moving image shooting mode may include a plurality of modes.

The shutter button 61 includes a first shutter switch 62 and second shutter switch 64. The first shutter switch 62 is turned on by a so-called half stroke (shooting preparation instruction) during the operation of the shutter button 61 attached to the image capture apparatus 100, and generates a first shutter switch signal SW1. In accordance with the first shutter switch signal SW1, the system control unit 50 starts operations such as AF (Auto Focus) processing, AE (Auto Exposure) processing, AWB (Auto White Balance) processing, and EF (pre-Electronic Flash) processing. The second shutter switch 64 is turned on by a so-called full stroke (shooting instruction) upon the completion of the operation of the shutter button 61, and generates a second shutter switch signal SW2. In accordance with the second shutter switch signal SW2, the system control unit 50 starts the operation of a series of shooting processes (actual shooting) till writing of image data on the recording medium 200 after readout of a signal from the image sensing unit 22.

By selecting and operating various function icons displayed on the display unit 28, functions are properly assigned to the respective operation members of the operation unit 70 for respective scenes, and the operation members function as various function buttons. The function buttons are, for example, an end button, return button, image feed button, jump button, narrow-down button, and attribute change button. For example, when the user presses a menu button, the display unit 28 displays a menu screen capable of various settings. The user can intuitively make various settings using the menu screen displayed on the display unit 28, a four-way selector button to the up, down, left, and right, and a SET button.

The controller wheel 73 shown in FIG. 1 is a rotatable operation member included in the operation unit 70, and is used to designate a selection item together with the selector button. When the user rotates the controller wheel 73, an electrical pulse signal is generated in accordance with the operation amount, and the system control unit 50 controls each unit of the image capture apparatus 100 based on the pulse signal. From the pulse signal, the angle by which the controller wheel 73 has been rotated, and the number of rotations can be determined. Note that the controller wheel 73 is an arbitrary operation member as long as its rotating operation can be detected. For example, the controller wheel 73 may be a dial operation member so that the controller wheel 73 itself rotates in accordance with a rotating operation by the user to generate a pulse signal. The controller wheel 73 may be an operation member formed from a touch sensor (so-called touch wheel) so that the controller wheel 73 itself does not rotate and detects a rotating operation with the user's finger on the controller wheel 73.

A power control unit 80 includes a battery detection circuit, a DC-DC converter, and a switching circuit which switches a block to be energized. The power control unit 80 detects mounting/no mounting of a battery, the type of battery, and the remaining battery level. The power control unit 80 controls the DC-DC converter based on the detection result and an instruction from the system control unit 50, and supplies necessary voltages to respective units including the recording medium 200 for a necessary period.

A power supply unit 30 includes a primary battery such as an alkaline battery or lithium battery, a secondary battery such as a NiCd battery, NiMH battery, or Li battery, and an AC adapter. A recording medium I/F 18 is an interface with the recording medium 200 such as a memory card or hard disk. The recording medium 200 is a recording medium such as a memory card for recording shot images, and includes a semiconductor memory and magnetic disk.

The above-described image capture apparatus 100 can execute shooting using single center point AF or face AF. In single center point AF, AF is performed for a single center point within the shooting frame. In face AF, AF is performed for a face within the shooting frame that is detected by a face detection function. Next, the face detection function will be explained. The system control unit 50 sends image data to undergo face detection to the image processing unit 24. Under the control of the system control unit 50, the image processing unit 24 causes a horizontal bandpass filter to act on the image data. Also, under the control of the system control unit 50, the image processing unit 24 causes a vertical bandpass filter to act on the processed image data. The horizontal and vertical bandpass filters detect edge components from the image data.

Then, the system control unit 50 performs pattern matching for the detected edge components, and extracts eye, nose, mouth, and ear candidates. The system control unit 50 determines that extracted eye candidates that satisfy preset conditions (for example, the distance between two eyes and the gradient) are paired eyes, and narrows down extracted eye candidates to only those including paired eyes. The system control unit 50 associates the narrowed-down eye candidates with other corresponding parts (nose, mouth, and ears) which form a face, and applies a preset non-face condition filter to them, detecting a face. The system control unit 50 outputs the face information in accordance with the face detection result, and ends the processing. At this time, the system memory 52 stores feature amounts such as the number of faces.

In this fashion, object information can be detected by performing image analysis for image data to undergo live view display or playback display, and extracting the feature amount of the image data. Although the embodiment has exemplified face information as object information, the object information includes various kinds of information such as red-eye determination, eye detection, eye closure detection, and smile detection.

Note that face AE, face FE, and face WB can be executed at the same time as face AF. Face AE optimizes the exposure of the entire frame in accordance with the brightness of a detected face. Face FE adjusts the electronic flash mainly for a detected face. Face WB optimizes the WB of the entire frame in accordance with the color of a detected face.

Personal authentication is also possible to record (register) in advance feature data of the face of a specific person in a nonvolatile memory, compare feature data of a face detected by face detection with the feature data of the registered person, and determine whether the detected face is the registered face. Relation information such as the name and birthday may be recorded in association with the feature data of the registered face. This makes it possible to display a name and the like for a face detected from a through image in the live view display in shooting or a face detected from a playback image. Face AF in shooting can be performed preferentially for a face identified as a registered face out of a plurality of detected faces.

Figure 3:
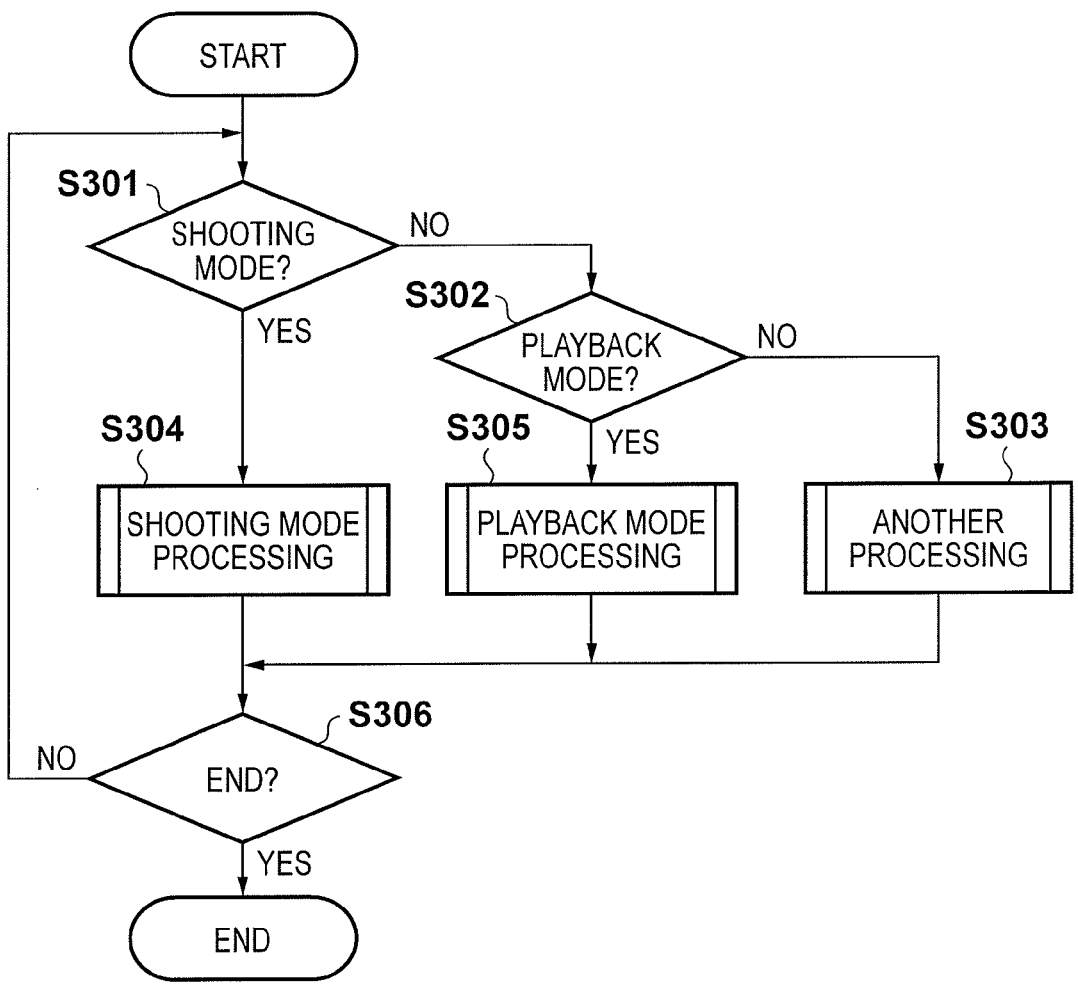
FIG. 3 is a flowchart showing the basic operation of the image capture apparatus.

FIG. 3 is a flowchart showing a basic sequence from the activation to end of the image capture apparatus 100 according to the embodiment. The image capture apparatus 100 in the embodiment can operate in one of the "shooting mode", "playback mode", "time display mode", and the like in accordance with the mode switch 60. In the "shooting mode", the display unit 28 displays a live view, and shooting is executed by operating the shutter button 61. In the "playback mode", shot images stored in the recording medium 200 are played back on the display unit 28 for browsing.

After the activation of the camera, the process advances to step S301. In step S301, the system control unit 50 determines based on the position of the mode switch 60 whether the image capture apparatus 100 is in the shooting mode. If the system control unit 50 determines that the image capture apparatus 100 is in the shooting mode, the process advances to step S304, and the system control unit 50 performs processing in the shooting mode. The shooting mode processing will be described later with reference to FIGS. 7 and 12A to 14B. If the system control unit 50 determines in step S301 that the image capture apparatus 100 is not in the shooting mode, the process advances to step S302. In step S302, the system control unit 50 determines based on the position of the mode switch 60 whether the image capture apparatus 100 is in the playback mode. If the system control unit 50 determines that the image capture apparatus 100 is in the playback mode, the process advances to step S305, and the system control unit 50 performs playback mode processing. The playback mode processing will be described later with reference to FIGS. 4 to 6 and 8A to 11B. If the system control unit 50 determines in step S302 that the image capture apparatus 100 is not in the playback mode, the process advances to step S303. In step S303, the system control unit 50 performs processing corresponding to another mode designated by the mode switch 60. Processing corresponding to another mode is, for example, processing in the time display mode in which only the current time is displayed. After the end of each mode processing, the process advances to step S306 to determine whether to shut down the camera operation. If it is determined to shut down the camera operation, the camera operation ends; if it is determined not to shut down the camera operation, the process returns to step S301. The camera operation is shut down when, for example, the power switch 72 is pressed.

[Processing in Playback Mode (Step S305)]

Figure 4:
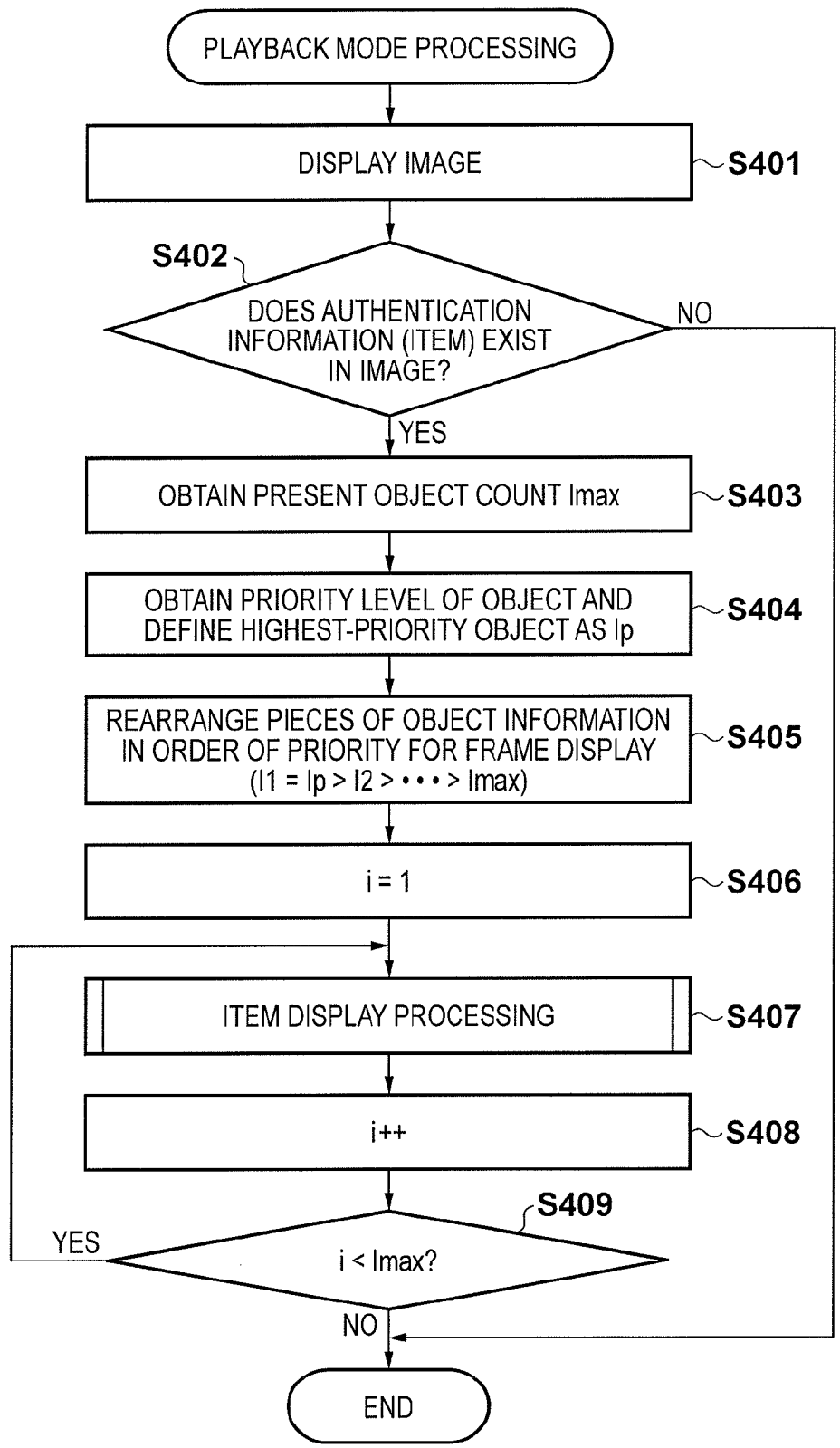
FIG. 4 is a flowchart showing playback mode processing according to an embodiment.
Figure 8A:
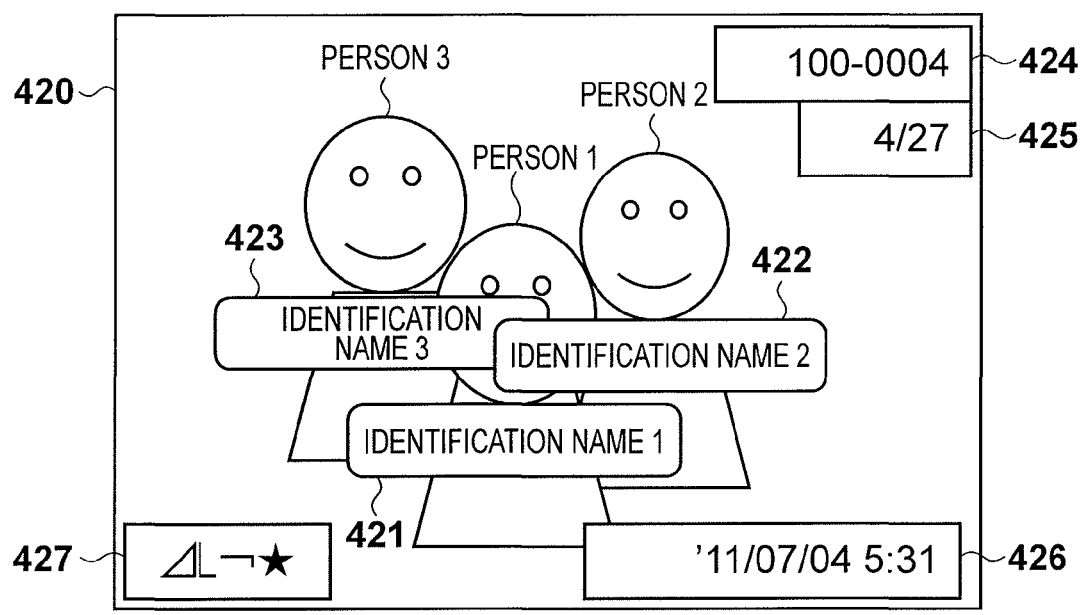
FIGS. 8A, 8B, 9A, 9B, 10, 11A, and 11B are views for explaining item display on a display unit 28 in the playback mode.

FIG. 4 is a flowchart showing processing in the playback mode in which an image is browsed according to the embodiment. When the playback mode processing starts, the system control unit 50 reads an image from the recording medium 200, and displays the read image on the display unit 28 in step S401. By this display, for example, an image 420 is displayed as shown in FIG. 8A. Then, the process advances to step S402, and the system control unit 50 determines whether the header (attribute information) of the image during display records the position of a face and relation information (for example, name) of the face as authentication information for the image. If the system control unit 50 determines that the authentication information exists, the process advances to step S403; if it determines that no authentication information exists, ends. The authentication information is recorded in the header of the image file when personal authentication was successful in shooting. Also, when face detection was performed and personal authentication was successful after shooting (for example, in playback), the authentication information may be written in the header of the image file. When authentication information exists, relation information (for example, name) can be displayed as a display item (to be referred to as an item hereinafter) for a face contained in the image. For example, items are displayed as items 421, 422, and 423 for detected persons 1, 2, and 3, as shown in FIG. 8A (display positions and overlapping order are adjusted, which will be described later). In step S402, it is determined whether authentication information is recorded in the header of an image to be displayed. Alternatively, face detection and personal authentication may be performed at this time to obtain authentication information. That is, it is also possible to perform personal authentication at this time, if a registered face is detected, obtain its position in the system memory 52, and obtain information related to the person of the face from the nonvolatile memory 56.

In step S403, the system control unit 50 obtains an object face detection count Imax in the image during display. When three objects, that is, person 1, person 2, and person 3 exist, as shown in FIG. 8A, and they are detected, Imax=3. Then, the system control unit 50 decides the order of priority of a plurality of objects detected from the image in steps S404 and S405, and displays items related to the objects in the decided order of priority in steps S406 to S409.

More specifically, in step S404, the system control unit 50 obtains the priority level of each object, and defines an object having a highest priority level as Ip (to be referred to as a leading object or main object hereinafter). Note that the priority can be decided as follows. Weighting is performed to give priority to a larger face or a face closer to the center of the frame among a plurality of faces detected from an image, thereby deciding the priority levels of the respective objects. Alternatively, a priority level is set in advance individually for each object and registered in the nonvolatile memory 56. Then, the registered priority levels are referred to for respective objects recognized in an image, obtaining priority levels. Based on the obtained priority levels, the order of priority of the respective objects is decided. Alternatively, information about the result of deciding the order of priority upon shooting, which is recorded in the header of the image file, is obtained, and the order of priority based on the obtained information is set. The embodiment assumes that person 1 is the main object Ip. In step S405, the system control unit 50 rearranges objects Ii in the order of priority for subsequent processing. For example, when person 1, person 2, and person 3 have priority levels in descending order, they are prioritized in the order of I1 (=Ip)>I2>I3.

Objects are rearranged in the order of priority to provide a display system (display order) convenient for a browsing apparatus before display because the image browsing function desirably allows browsing even an image shot by a general image capture apparatus to which the present invention is not applied. After that, in step S406, the system control unit 50 initializes, to 1, a variable i indicating the item rendering order.

Figure 5:
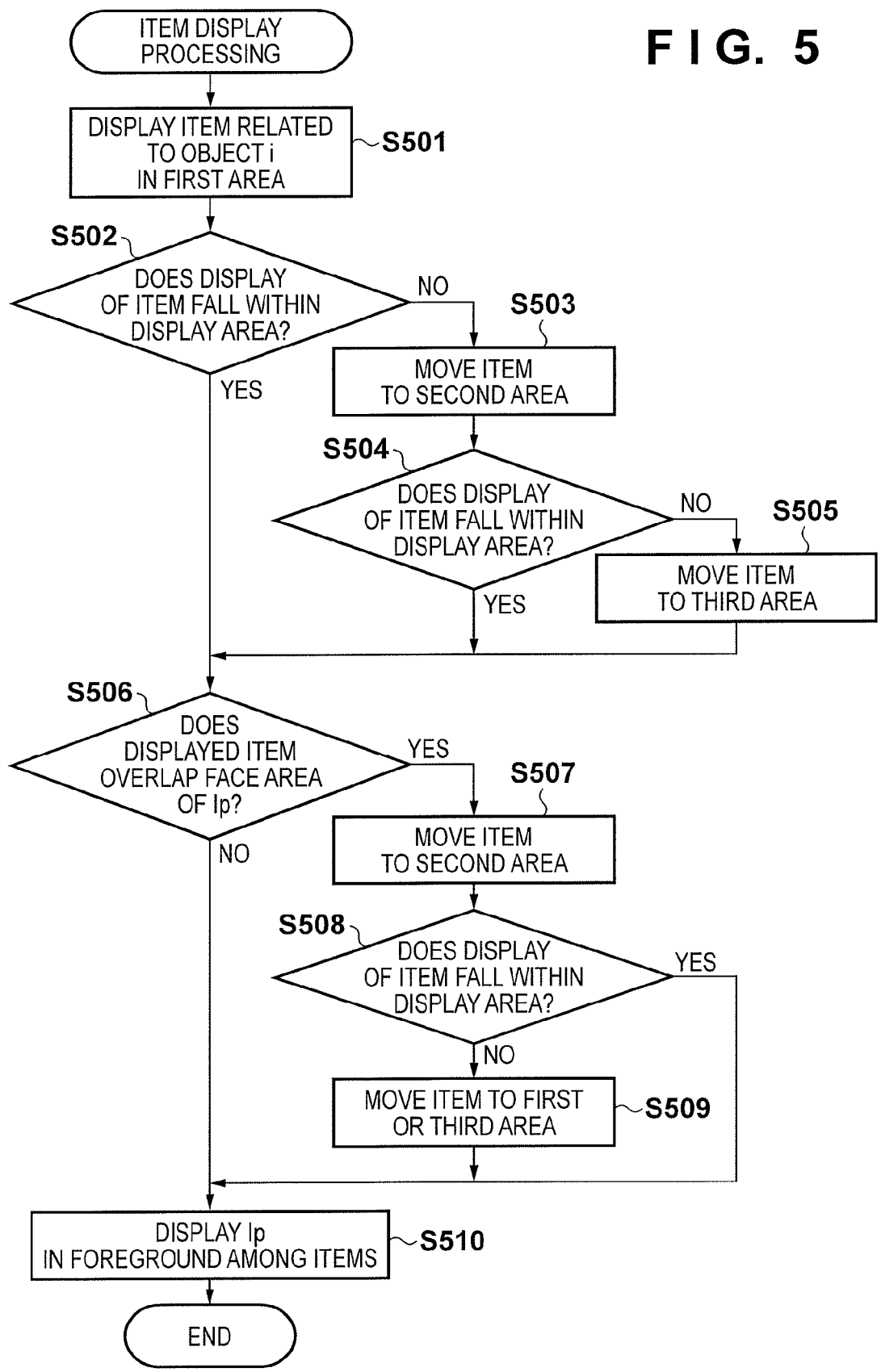
FIG. 5 is a flowchart showing item display processing according to the embodiment.
Figure 6:
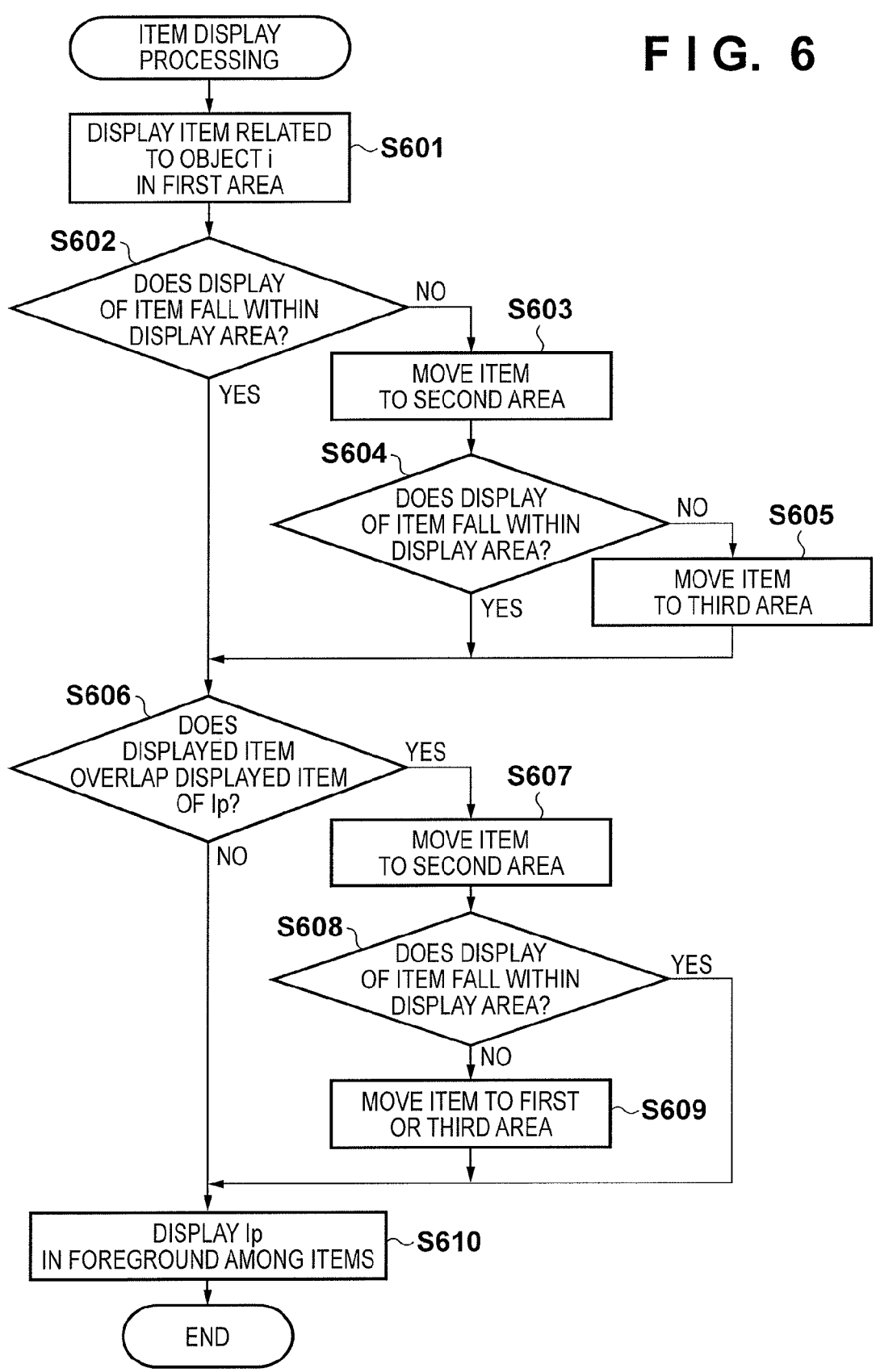
FIG. 6 is a flowchart showing item display processing according to the embodiment.

In step S407, the system control unit 50 executes item display processing for displaying an item related to each object. The item display processing will be explained below with reference to FIGS. 5 and 6. In the item display processing, the item of each detected object is displayed basically below the center of the face of the object. For example, for an image as shown in FIG. 8A, when items are displayed at basic positions, the items 421, 422, and 423 are displayed in correspondence with person 1, person 2, and person 3. However, in the display form as shown in FIG. 8A, the item 422 of person 2 and the item 423 of person 3 overlap the face area of the main object (IP=person 1), and the face of the main object cannot be seen. To prevent this, the item display processing according to embodiment adjusts the display positions of the items so that the face of the main object can be easily seen (FIG. 5). Also, the display of the item of the main object and the display of another item are controlled not to overlap each other as much as possible, improving the visibility of the display of the item of the main object (FIG. 6).

In step S408, the system control unit 50 increments the variable i indicating the item rendering order. In step S409, the system control unit 50 determines whether the variable i indicating the rendering order has reached Imax. If the variable i has not reached the face detection count Imax, the process returns to step S407 to repeat the item display processing. If the variable i has reached the face detection count Imax, the process ends.

The item display processing in step S407 will be explained. FIG. 5 is a flowchart showing an item display processing sequence. In the item display processing, for a plurality of objects in an image browsed and displayed on the screen of the display unit 28, items related to the respective objects are displayed at positions each having a predetermined relative positional relationship with the object (step S501). Further, in the item display processing of the embodiment, the display positions of the items are adjusted to widen the visible range for higher visibility of the items (steps S502 to S509). Especially in steps S501 to S505, if at least part of the displays of the items extends outside the image, the display positions are moved so that all the items fall within the image. In steps S506 to S510, when the display (for example, face) of a main object serving as an object having a highest priority level and the display of an item related to an object other than the main object overlap each other, the display position of the item related to the other object is moved.

First, in step S501, the system control unit 50 displays an item related to the object Ii in the first area. In the embodiment, the first area is the basic position described above, and is defined by a position relative to the face of a person serving as an object. The first area is, for example, a display area when an item is displayed at a lower position by a predetermined distance from the face area of a person. When the item 421 of person 1 is displayed in the first area in the image as shown in FIG. 8A, it is displayed at a position as shown in FIG. 8A. In step S502, the system control unit 50 determines whether items displayed in step S501 fall within the display area of the display unit 28 (in the embodiment, within a display area of the display unit 28 where the image 420 is displayed). If all the displayed items fall within the display area, the process advances to step S506; if NO, to step S503.

Figure 8B:
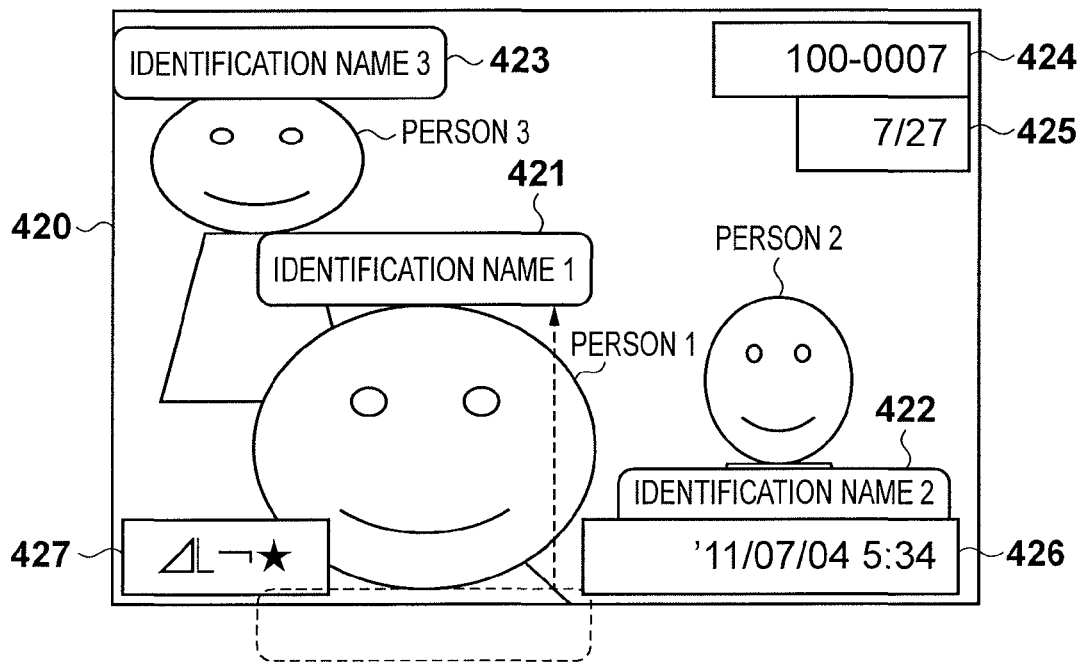
Figure 9A:
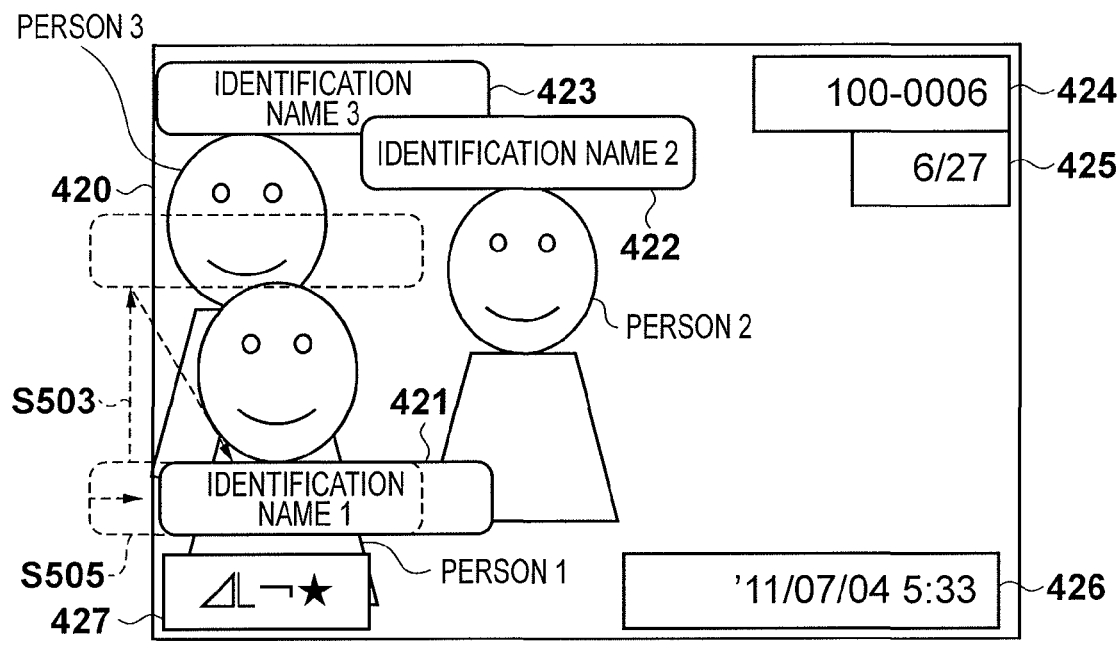

In step S503, the system control unit 50 moves the display position of the item displayed in step S501 to the second area. The second area is also defined by a relative positional relationship with the object. In the embodiment, the second area is an item display area at an upper position by a predetermined distance from the face area of a person. In the example of FIG. 8B, the item 421 of person 1 extends outside the display area of the display unit 28 in the first area, so the item 421 is moved to the second area for person 1. In step S504, the system control unit 50 determines whether the display of the item moved in step S503 falls within the display area of the display unit 28. If the display of the item falls within the display area, the process advances to step S506. If the display of the item extends outside the display area, the process advances to step S505. In step S505, the system control unit 50 moves the display position of the item displayed in step S503 to the third area. The third area is a position obtained by further moving the first area horizontally to the right or left so that the display of the item falls within the display area of the display unit 28. For example, when the item 421 of person 1 is displayed in the first area, it extends outside the display area, as shown in FIG. 9A. Hence, the item 421 is moved to the second area by the processing of step S503. However, the item 421 extends outside the display area even in the second area, and thus is moved to the third area (step S505). As a result, the item 421 is displayed at a position as shown in FIG. 9A.

In step S506, the system control unit 50 determines whether the display of the item at the display position set in step S501, S503, or S505 overlaps the face area of the object Ip serving as the main object. If the display of the item and the face area of the object Ip overlap each other, the process advances to step S507; if they do not overlap each other, ends. In step S506, if the object related to the item to be processed is the main object Ip, the system control unit 50 determines that the display of the item and the face area of the main object Ip do not overlap each other. In this manner, if the object to be processed is the main object (that is, Ii=Ip), the display position of the item is changed only when it extends outside the display area. Accordingly, the display of the item related to the main object can be placed preferentially at an easy-to-see position.

Figure 9B:
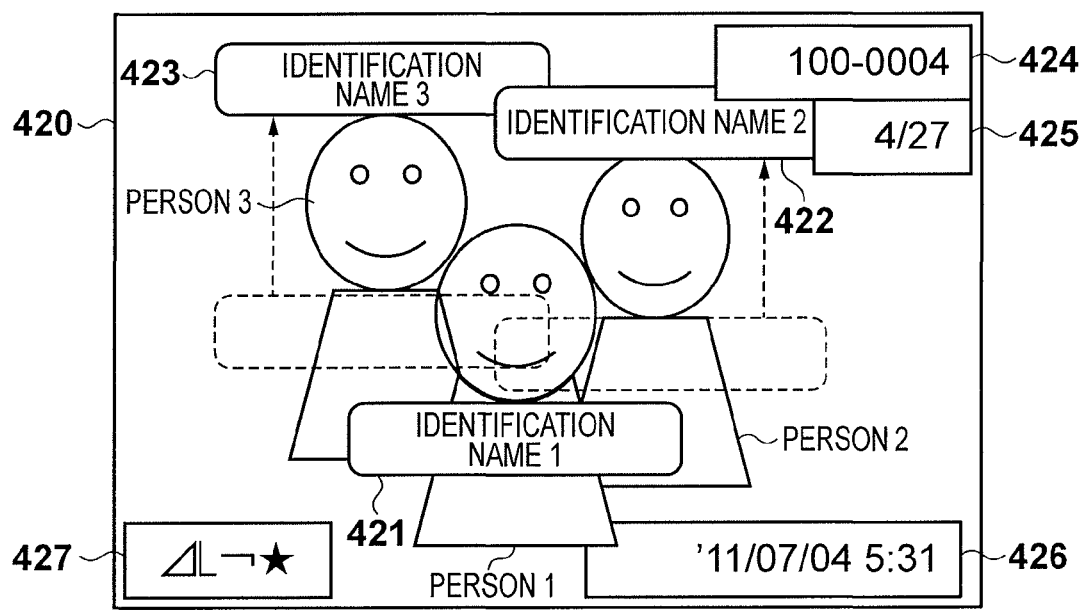

If Ii≠Ip, that is, the object related to the item to be processed is not the main object, the system control unit 50 determines whether the display of the item of the object Ii overlaps the face area of the object Ip serving as the main object. If the system control unit 50 determines in step S506 that the display of the item and the face area of the object Ip overlap each other, it moves the item displayed in step S501, S503, or S505 to the second area in step S507. This can prevent the display of the item of the object Ii from overlapping the face area of the object Ip, as shown in FIG. 9B. The face of the main object can be easily browsed.

Figure 10:
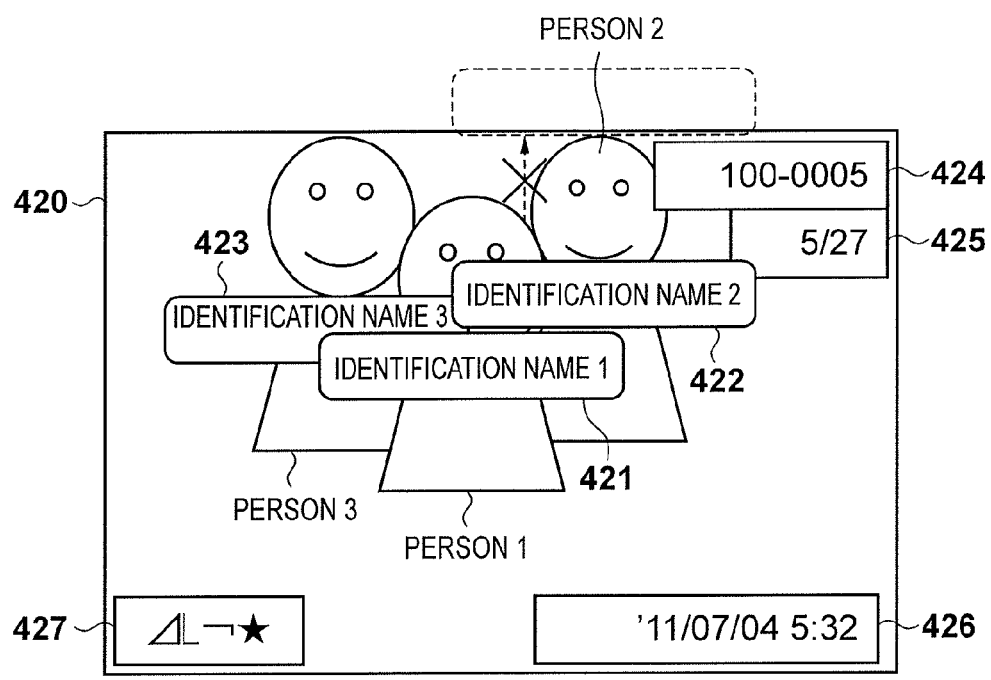

In step S508, the system control unit 50 determines whether the item moved and displayed in step S507 falls within the display area. If the item falls within the display area, the item display processing ends; if the item falls outside the display area, the process advances to step S509. In step S509, the system control unit 50 moves the item displayed in step S507 to the first area, and if the display of the item in the first area extends outside the display area, to the third area. That is, since an item other than the main object overlaps the face area of the main object, the display position of the item is moved. However, when the resultant display of the item falls outside the display area, the item is permitted to overlap the face area of the main object. For example, as shown in FIG. 10, the item 422 overlaps the face area of the main object (person 1), and thus is moved to the first area (step S507). However, the item 422 extends outside the display area, and returns again to the first area (step S509). In this case, the item overlaps the face of the main object. However, it is more inconvenient for the user that an item other than the main object cannot be displayed in the display area. Thus, this control is adopted. In step S510, the system control unit 50 displays the display of the item of the object Ip in the foreground among the displays of all items. Then, the item display processing ends.

In the example of FIG. 5, an item is displayed or moved in steps S501, S503, S505, S507, and S509. However, the present invention is not limited to this. At these timings, an item may be neither displayed nor moved, and only a display position may be obtained (calculated) on the assumption that the item was displayed or moved in steps S501, S503, S505, S507, and S509. Based on the obtained display position, the respective determinations and processes in the processing of FIG. 5 may be performed to adjust a final display position. Then, after NO in step S409 of FIG. 4, it may be controlled to display all items at finalized display positions.

In the item display processing, displays (image number 424, total image count display 425, shooting date & time 426, and image information 427 in FIGS. 8A to 10) other than items related to persons may be added and displayed in the foreground with respect to the displays of the items related to the objects. Accordingly, the image capture apparatus 100 can make more noticeable displays which are more important than information related to objects.

Note that the above-mentioned item related to an object includes, for example, the person name and birthday information. Although the priority level of an object is obtained in step S404, the system control unit 50 may determine it from the contents of a shot image. For example, the system control unit 50 may set the order of priority in the order of a distance from the image capture apparatus to an object (for example, a closest object is set as a main object).

Alternatively, the smile of an object may be scored to set the order of priority in descending order of the score of the smile. Further, the order of priority may be decided by applying the above-mentioned distance or smile score to a priority level registered in advance.

The processing shown in FIG. 5 has been explained for a case in which the display of an item overlaps the face area of a main object. Further, the embodiment adjusts item display positions in consideration of overlapping of items so that the item itself of the main object can be easily seen. A solution when items overlap each other will be explained with reference to FIG. 6. Note that either the processing shown in FIG. 5 or the processing shown in FIG. 6 may be executed, or both of them may be executed.

FIG. 6 is a flowchart showing another example of the item display processing described with reference to FIG. 5. According to the item display processing of FIG. 5, in the processes of steps S506 to S509, the item of an object other than a main object is displayed at a position where it does not overlap the face of the main object. To the contrary, in the example of FIG. 6, the item of an object other than a main object is adjusted to be displayed at a position where it does not overlap the item of the main object. Note that the processing shown in FIG. 6 is executed in step S407 of FIG. 4. Processes in steps S601 to S605 are the same as those in steps S501 to S505, and processes in steps S607 to S610 are the same as those in steps S507 to S510. By the processes in steps S606 to S609, when the display of an item related to a main object serving as an object having a highest priority level overlaps that of an item related to an object other than the main object, the display position of the item related to the other object is moved.

Figure 11A:
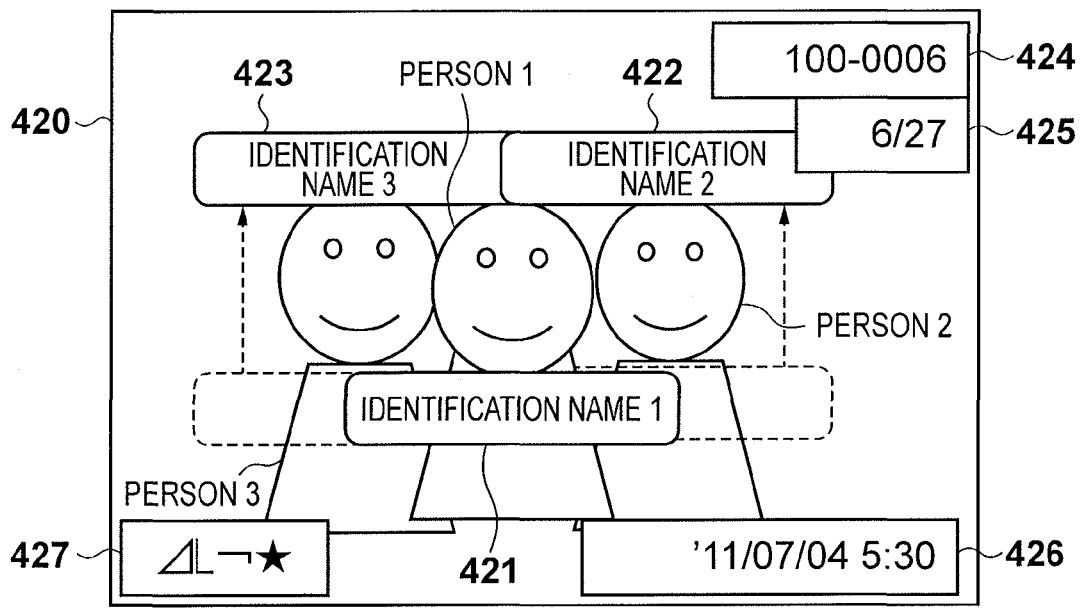

In step S606, the system control unit 50 determines whether the display of the item of an object Ii overlaps that of the item of the object Ip serving as the main object. If the displays of these items overlap each other, the process advances to step S607; if they do not overlap each other, the item display processing ends. In step S607, the system control unit 50 moves the item displayed in step S601, S603, or S605 to the second area. By this processing, both the items 422 and 423 other than that of the main object are moved to the second area, as shown in FIG. 11A. This can prevent the display of the item of the object Ii from overlapping the item of the main object Ip, as shown in FIG. 11A, improving the visibility of the item of the main object.

Also in the example of FIG. 6, similar to FIG. 5, an item is displayed or moved in steps S601, S603, S605, S607, and S609. However, the present invention is not limited to this. At these timings, an item may be neither displayed nor moved, and only a display position may be obtained (calculated) on the assumption that the item was displayed or moved in steps S601, S603, S605, S607, and S609. Based on the obtained display position, the respective determinations and processes in the processing of FIG. 6 may be performed to adjust a final display position. Then, after NO in step S409 of FIG. 4, it may be controlled to display all items at finalized display positions.

Figure 11B:
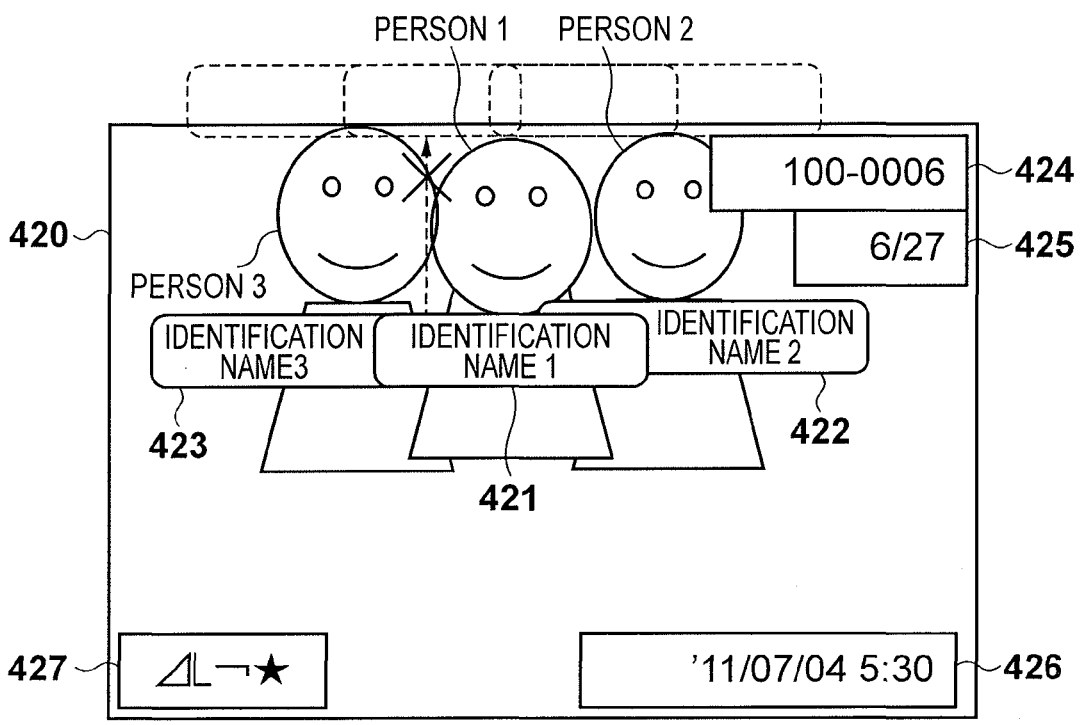

In step S610, the system control unit 50 displays the item of the main object Ip in the foreground. For example, when the items 422 and 423 are moved in step S607 and at least part of them extends outside the display area, as shown in FIG. 11B, they return to the first area in step S609. In step S610, the item 421 of the object Ip is displayed in the foreground. This processing has an effect capable of maintaining the visibility of the item of a main object even when the displays of items overlap each other.

The sequences of FIGS. 5 and 6 may be combined to perform the processes in steps S606 to S609 before step S510 after steps S506 and S509 of FIG. 5. This can prevent the display position of the item of an object other than a main object from overlapping both the face and item of the main object.

When the item display processing in FIG. 5 is employed, the position of the item of another object is determined unless the position of the item of a main object is not determined. Therefore, items serving as object information may be arranged in ascending order of priority in step S405, and displayed in the order from an object having a lower priority level in steps S406 to S409. When only the position of the item of a main object is determined first, even if the item display processing in FIG. 6 is adopted, items serving as object information may be arranged in ascending order of priority in step S405, and displayed in the order from an object having a lower priority level. By rendering items in the order of priority of objects, a plurality of items related to a plurality of objects are displayed in a display order complying with the order of priority so that an item related to an object having a highest priority level is displayed in the foreground of the screen.

As described above, the image display processing in the playback mode according to the embodiment has an effect capable of, even when many faces exist in a limited display area, displaying a related item with high visibility for at least the face of a main object.

[Shooting Mode Processing (Step S304)]

Figure 12A:
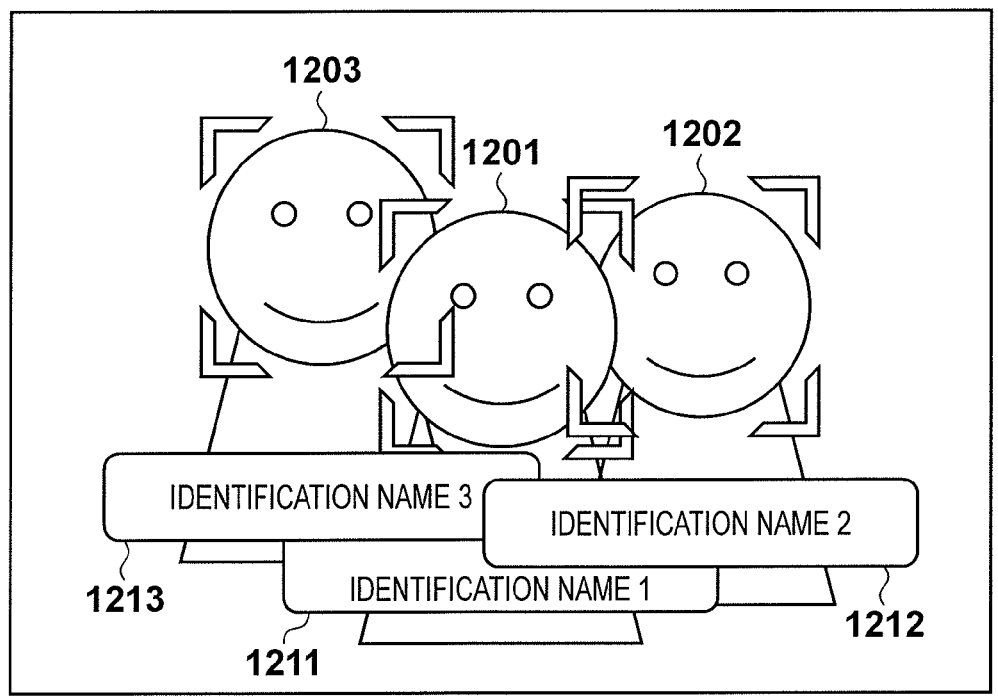
FIGS. 12A, 12B, 13A, 13B, 14A, and 14B are views for explaining item display on the display unit 28 in the shooting mode.
Figure 12B:
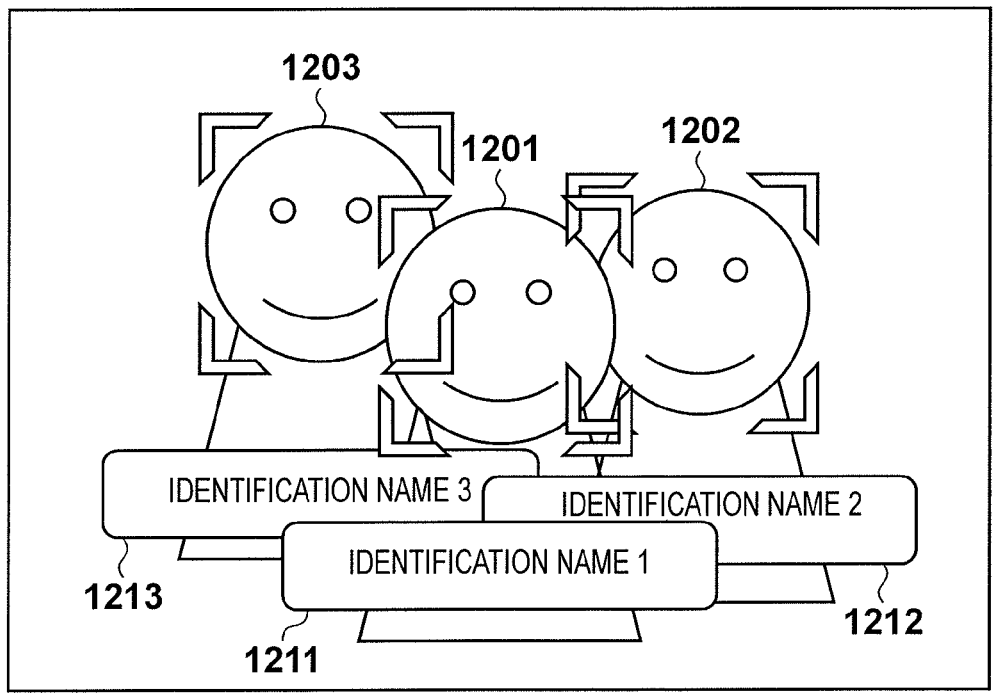

Next, display processing for the display unit 28 functioning as an electronic viewfinder in the shooting mode, that is, the display unit 28 which performs live view display will be explained. For example, a state in which three persons are simultaneously captured in the image capturing frame, as shown in FIGS. 12A and 12B, will be considered. In this display, when it is determined that these three persons match registered faces, the items of all the persons are displayed at basic positions, that is, in areas immediately below the respective faces, as shown in FIG. 12A. In this display, however, an identification name serving as the item of a face 1201 of a person serving as a main object captured large at the center of the frame is interrupted by the identification name of another person, impairing visibility. To solve this, the embodiment will explain an example in which the display positions of the items of objects and their overlapping order are adjusted not to impair the visibility of the item of a main object. An operation when the shooting mode processing (step S304) in the embodiment is executed will be explained with reference to the flowchart of FIG. 7.

In step S701, it is determined whether the face of a person has been detected from a through image during shooting. If no face has been detected, the process ends. If the face of a person has been detected, the process advances to step S702, and the system control unit 50 stores the face detection count Imax. In the image exemplified in FIG. 12A, Imax=3. In step S703, the system control unit 50 decides a main object based on the priority levels of the objects. The main object is decided from the result of weighting based on, for example, whether a face is closer to the center of the frame among a plurality of detected faces, is larger, or has been registered. In this example, the face 1201 at the center in the image of FIG. 12A is decided as a main object. In step S704, the system control unit 50 sets the display order of an item corresponding to the face of the main object to be last. Setting of the display order of the remaining objects (faces 1202 and 1203) is not particularly limited. In step S705, the system control unit 50 initializes the rendering order i to 1.

In steps S706 to S713, items are displayed in the order in which the item of the object having a highest priority level (main object) comes last. Thus, a plurality of items related to a plurality of objects are displayed in a display order complying with the order of priority so that an item related to an object having a highest priority level is displayed in the foreground.

In step S706, the system control unit 50 renders a face recognition frame for a face having the rendering order i. In step S707, the system control unit 50 collates the face having the rendering order i with data registered in advance, and determines whether the face is a registered one. If the system control unit 50 determines that the face is not a face registered in advance, the process advances to step S712 to increment the rendering order i. If the system control unit 50 determines in step S707 that the face is a face registered in advance, the process advances to step S708. In step S708, the system control unit 50 determines whether the face having the rendering order i is the face of the main object. In the embodiment, when i=Imax, it is determined that the face of the object is that of the main object. If the system control unit 50 determines that the face having the rendering order i is the face of the main object, the process advances to step S709. In step S709, the system control unit 50 determines whether the rendering range of an item (person name in this example, but the item is not limited to this) corresponding to the face of the main object falls within the display area (area of the display unit 28 where the through image is displayed). If the system control unit 50 determines that the rendering range of the item falls outside the display area, the process advances to step S710 to adjust the rendering position so that the item falls within the display area. If the rendering range of the item falls within the display area, the processing in step S710 is skipped. Also, if the system control unit 50 determines in step S708 that the face having the rendering order i is not the face of the main object, a series of item display position adjustment processes in steps S709 and S710 is not performed.

In step S711, the system control unit 50 renders the item (person name in this example) corresponding to the face having the rendering order i. Then, the system control unit 50 increments the rendering order i in step S712, and determines in step S713 whether the rendering order i has reached the face detection count Imax. If the rendering order i has not reached the face detection count Imax, the process returns to step S706 to repeat the above-described series of processes. If the rendering order i has reached the face detection count Imax, the process advances to step S714.

In step S714, another processing in the shooting mode processing is performed. For example, this processing includes:
Acceptance of a shooting setting change operation from the user, and change of settings
Shooting preparation processing such as AF and AE in accordance with the signal SW1 generated by a half stroke of the shutter button 61, and actual shooting processing in accordance with the signal SW2 generated by a full stroke of the shutter button 61

Note that the shooting preparation processing is performed in accordance with a detected face when it is set to perform face AF. In face AF, the shooting preparation processing can be adjusted preferentially to a face registered by personal authentication (for example, a registered face is set as the AF area). Also, personal authentication is performed for an image obtained by actual shooting. When a registered face is detected, information indicating the position of the detected face, and information (for example, name and birthday) recorded in the nonvolatile memory 56 as relation information of the detected face are recorded in the header of the image file. The image file is then recorded on the recording medium 200.

In step S715, it is determined whether an event to end the shooting mode processing has occurred. The event to end the shooting mode processing includes an event in which the mode switch 60 is operated to switch the mode to one (for example, playback mode) other than the shooting mode, and an event to turn off the power supply. If an event to end the shooting mode processing has not occurred, the process returns to step S701 to repeat the processing. If it is determined that an event to end the shooting mode processing has occurred, the shooting mode processing ends.

By performing the shooting mode processing, a display state as shown in FIG. 12B can be obtained. More specifically, an item 1211 of the face 1201 serving as the main object is rendered in the foreground, and the item 1211 overwrites the displays of items 1212 and 1213 of the faces 1202 and 1203. As a result, the visibility of the item related to the main object is ensured.

Figure 13A:
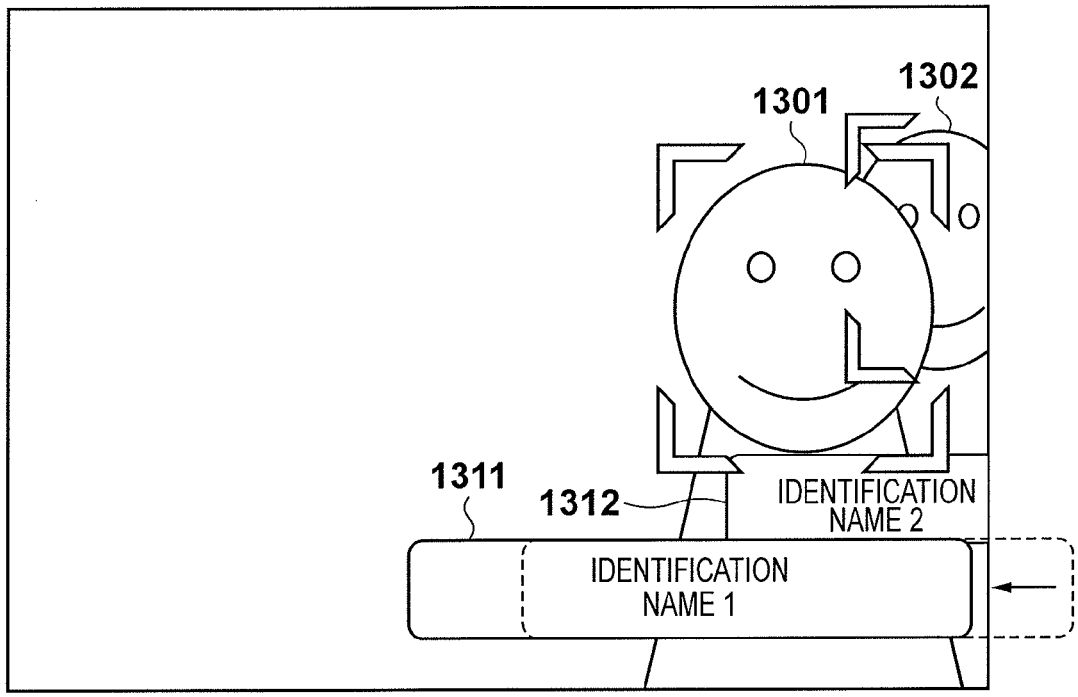

FIG. 13A shows a display example when a series of correction processes regarding the rendering position of an item related to a main object in steps S709 and S710 is performed. In FIG. 13A, an entire item 1311 of a face 1301 serving as a main object is displayed by translating the rendering position of the item 1311 from a basic position (indicated by a broken line) to the left. An item 1312 related to a face 1302 other than the main object remains extending outside the display area, and is displayed behind the display of the item of the main object.

Figure 7:
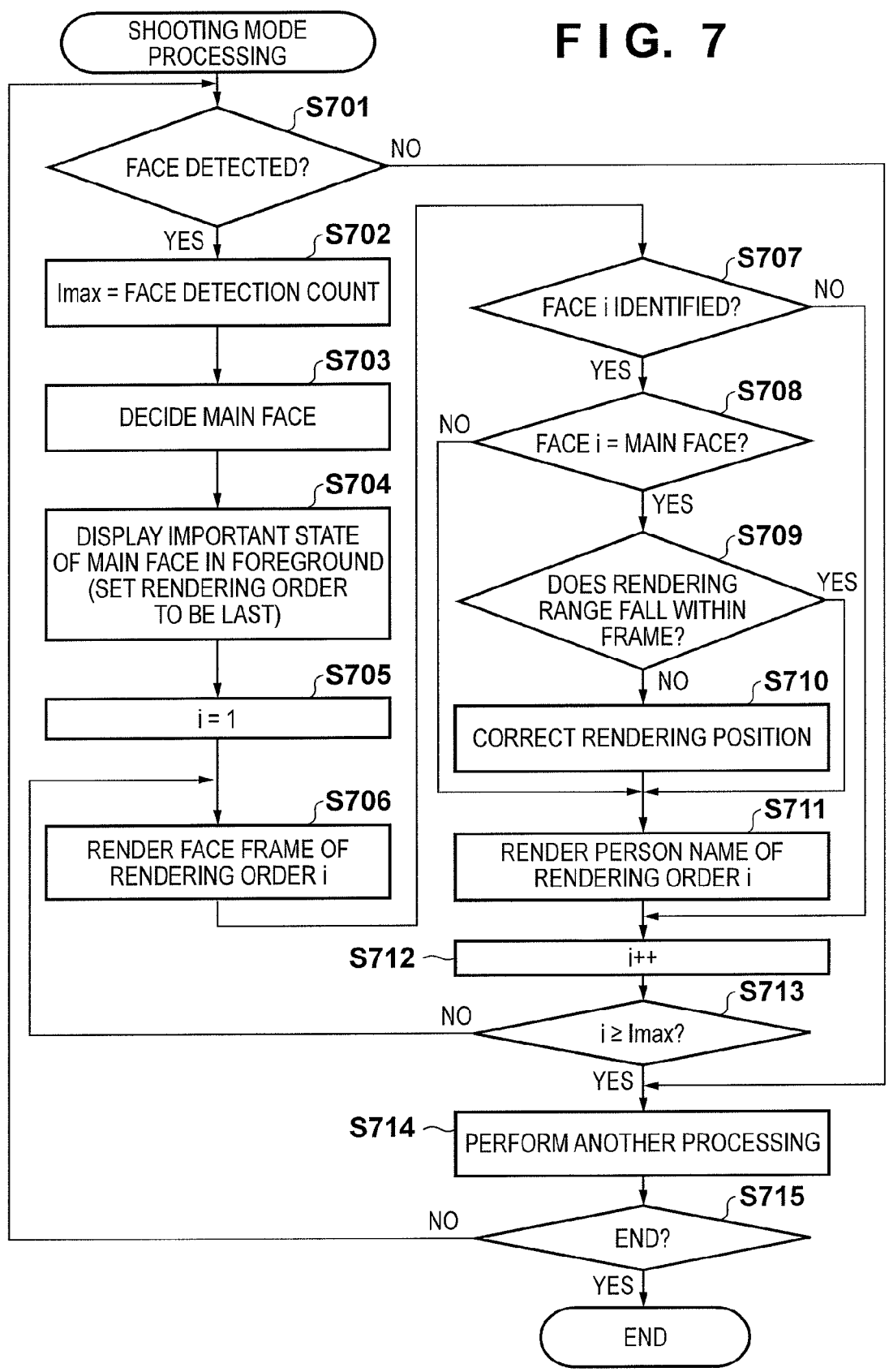
FIG. 7 is a flowchart showing shooting mode processing according to the embodiment.

The above processing is lower in processing load than item display position optimization in browsing mode processing because the rendering position of an item related to only a main object is optimized. In the shooting mode, the display unit 28 displays a live view, so the low-load processing is suitable. Since a through image is displayed as live view display, an object in the image changes dynamically. In the embodiment, therefore, the processing shown in FIG. 7 is repetitively executed during the shooting mode. If the priority level of the object in the image during the live view display changes, the item display is changed following this. In the embodiment, by reducing item adjustment, low-load processing is performed in the live view display in shooting than in still image playback. Even display processing which is repetitively executed can be performed smoothly.

Figure 14A:
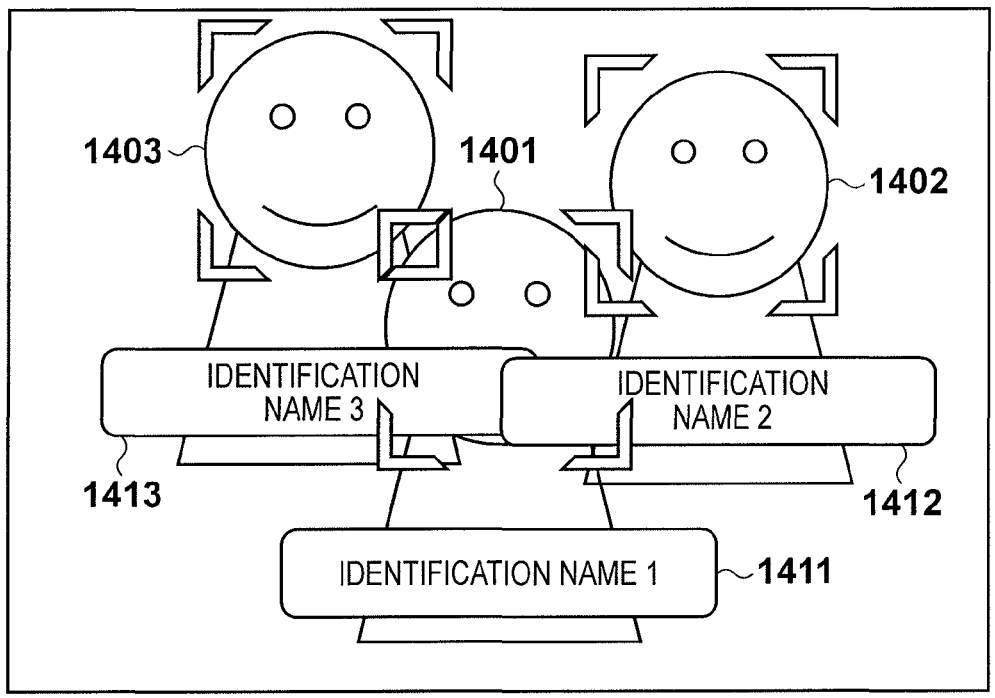
Figure 14B:
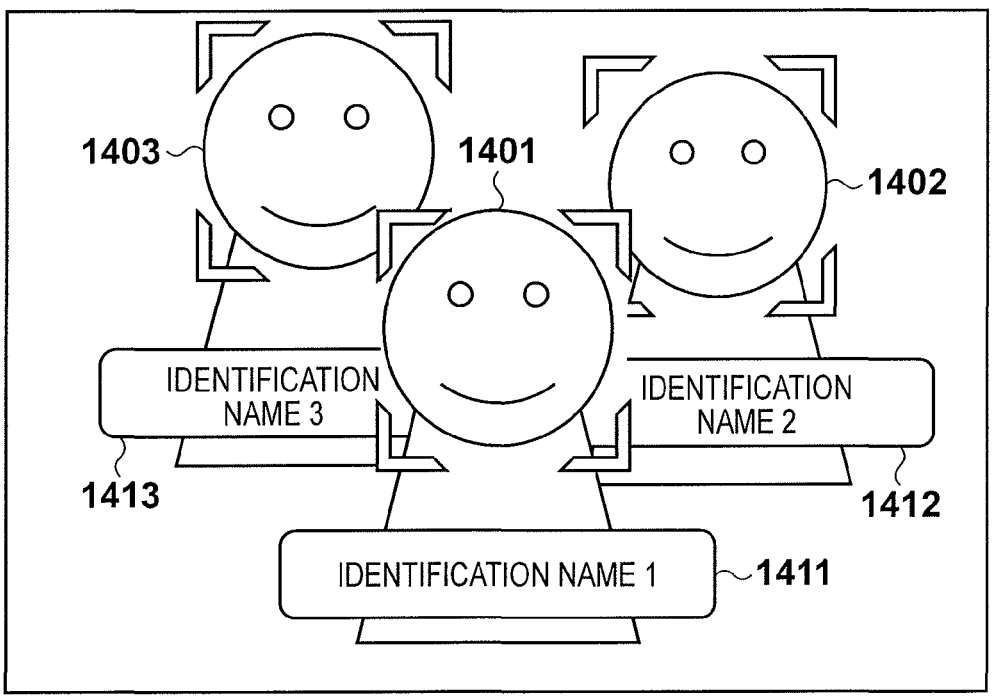

Depending on the positional relationship between objects, the displays of items 1412 and 1413 of face 1402 and 1403 overlap a face 1401 of a leading object, as shown in FIG. 14A. In this case, for example, after it is determined in step S713 that rendering processing for all items has ended (YES in step S713), hollow rendering may be performed to delete a rendered image from an area within a frame surrounding the face 1401 of the leading object. In this way, in the shooting mode, an image in a specific area including the leading object (main object) is displayed in the foreground with respect to the display of an item related to another object. As a result, the image as shown in FIG. 14A is changed to one as shown in FIG. 14B. Thus, the visibility of the main object improves. Note that the specific area may be an area where AF is performed in shooting.

Even when a plurality of faces exist, the above-described control can implement display control capable of
displaying larger numbers of person names and person faces in the playback mode to easily see them, and
ensuring the visibility of a person name corresponding to the face of a main object with a low processing load in the shooting mode in which the load is applied to shooting processing.

Figure 13B:
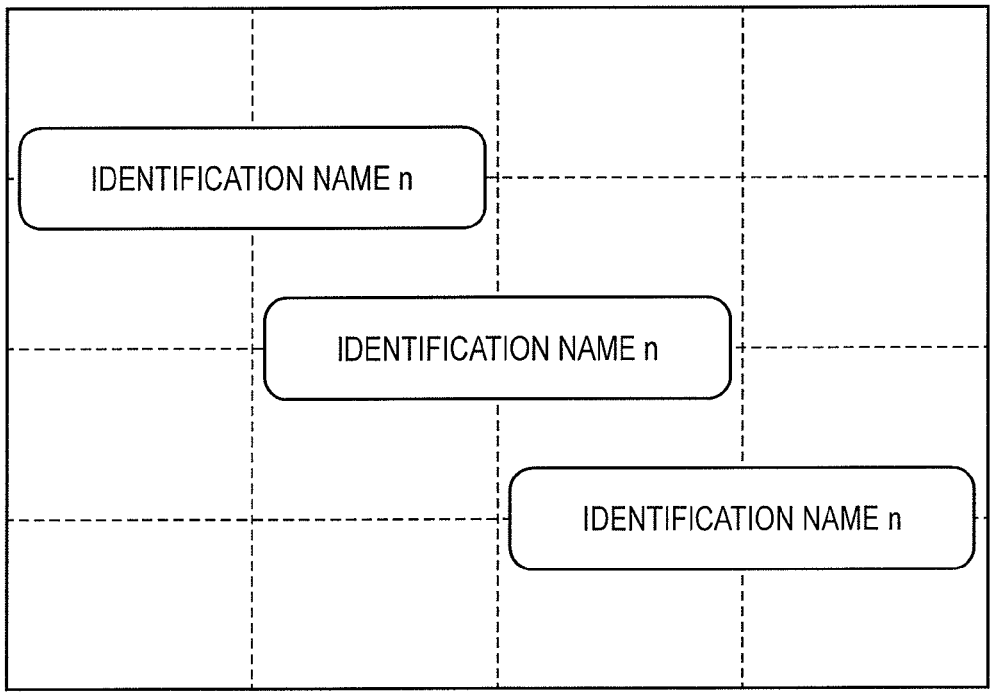

In item display in the playback mode and shooting mode, the following control may be executed to further reduce the processing load. More specifically, the display position of an item related to an object is selected from predetermined positions based on the position of the object. For example, renderable positions are restricted to only positions each where the intersection point of lines vertically and horizontally dividing the frame into four comes to the center of an item, as shown in FIG. 13B. In FIG. 13B, items are arranged at three of these positions. Of these positions, a position which is outside the face area of an object and is closest to this area is selected as a rendering position. This processing reduces the rendering count accompanying movement of an object. Increasing the division count improves the followability of a display item to an object. Decreasing the division count decreases the rendering count and reduces the processing load. To decrease the rendering count in the shooting mode, when the moving distance of an object on the frame (screen) exceeds a predetermined value, the display position of an item related to the object may be updated.

As described above, in the image capture apparatus according to the embodiment or the display control apparatus applied to the image capture apparatus, a display capable of easily determining the relation with an object can be implemented by simpler display control. For example, when the image capture apparatus is in the playback mode, pieces of information are displayed to be discriminable even in an image in which many faces exist densely, while maintaining the relation with objects. Even in the shooting mode in which the load of the arithmetic device cannot be applied to control for maintaining a satisfactory information display state, the information display of only a main object is kept in a discriminable state. The present invention can provide a product competitive in the manufacturing cost, main body size, and the like while ensuring the visibility of information related to an object by switching the display control.

The present invention has been described in detail based on the preferred embodiment. However, the present invention is not limited to the specific embodiment, and includes various forms without departing from the gist of the invention. Parts of the above-described embodiment may be properly combined.

The present invention is also implemented by executing the following processing. More specifically, software (program) for implementing the functions of the above-described embodiment is supplied to a system or apparatus via a network or various storage media, and the computer (or CPU or MPU) of the system or apparatus reads out and executes the program.

According to the present invention, an item display capable of easily determining the relation with an object can be maintained even in the live view display.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-289892, filed Dec. 28, 2011, and No. 2011-289893, filed Dec. 28, 2011 which are hereby incorporated by reference herein in their entirety.

What is claimed is:
1. A display control apparatus comprising:
 a processor implementing the functions of a display control unit, a decision unit and a first determination unit, wherein:
 the display control unit is configured to display, together with an image on a display unit, items related to a plurality of objects in the image, the display control unit displaying the items related to the respective objects at basic display positions having a predetermined positional relationship with the objects;
 the decision unit is configured to decide an object from the plurality of objects, which has high priority; and
 the first determination unit is configured to determine whether a face area of the object having high priority and a basic display position for an item of another object overlap each other,
 wherein in case that the first determination unit determines that the face area of the object and the basic display position for the item of the other object overlap each other, the display control unit controls to display the item related to the other object at a position shifted from the basic display position.

2. The apparatus according to claim 1, wherein the object having the high priority is a main object.

3. The apparatus according to claim 1, wherein the processor further implements the functions of a second determination unit configured to determine whether an object in the image smiles,
- wherein the decision unit raises a priority level of the object determined by the second determination unit to smile.

4. The apparatus according to claim 1, wherein the processor further implements the functions of a setting unit configured to set priority levels for respective objects in advance and store the priority levels in a memory,
- wherein the decision unit decides an object having high priority by referring to the priority levels stored in the memory.

5. The apparatus according to claim 1, wherein in case that the first determination unit determines that the face area of the object and the basic display position for the item of the other object overlap each other, the display control unit controls to display the item related to the other object at a position having a second positional relationship with the other object, and
- wherein the second positional relationship is different from the predetermined positional relationship.

6. The apparatus according to claim 5, wherein the predetermined positional relationship defines a display position of an item related to an object so that the item is displayed at a lower side of the object, and the second positional relationship defines a display position of an item related to an object so that the item is displayed at an upper side of the object.

7. The apparatus according to claim 1, wherein the predetermined positional relationship defines a relative positional relationship between an object and an item related to the object.

8. The apparatus according to claim 1, wherein an item related to an object indicates relation information of the object.

9. The apparatus according to claim 8, wherein an item related to an object indicates a name of the object.

10. The apparatus according to claim 1, further comprising:
- a storage configured to store feature data of an object and relation information of the object in advance; and
- wherein the processor further implements the functions of a personal authentication unit configured to perform a personal authentication for an object in the image based on the feature data to obtain relation information of the object,
- wherein the display control unit displays the relation information obtained by the personal authentication unit as an item related to the object.

11. A display control method comprising:
- displaying, together with an image on a display unit, items related to a plurality of objects in the image, the display control unit displaying the items related to the respective objects at basic display positions having a predetermined positional relationship with the objects;
- deciding an object from the plurality of objects, which has high priority; and
- determining whether a face are of the object having high priority and a basic display position for an item of another object overlap each other,
- wherein in case that it is determined that the face area of the object and the basic display position for the item of the other object overlap each other, the item related to the other object is displayed at a position shifted from the basic display position.

12. A non-transitory computer readable storage medium storing a program for causing a computer to perform:
- displaying, together with an image on a display unit, items related to a plurality of objects in the image, the display control unit displaying the items related to the respective objects at basic display positions having a predetermined positional relationship with the objects;
- deciding an object from the plurality of objects, which has high priority; and
- determining whether a face area of the object having high priority and a basic display position for an item of another object overlap each other,
- wherein in case that it is determined that the face area of the object and the basic display position for the item of the other object overlap each other, the item related to the other object is displayed at a position shifted from the basic display position.

* * * * *